United States Patent
Lyon et al.

(10) Patent No.: US 9,340,275 B2
(45) Date of Patent: May 17, 2016

(54) WINDOW ASSEMBLY INSTALLATION

(71) Applicant: Cessna Aircraft Company, Wichita, KS (US)

(72) Inventors: Daniel Jonathan Lyon, Wichita, KS (US); Joe Garland Skerbetz, Wichita, KS (US)

(73) Assignee: TEXTRON INNOVATIONS, INC., Providence, RI (US)

( * ) Notice: Subject to any disclaimer, the term of this patent is extended or adjusted under 35 U.S.C. 154(b) by 0 days.

(21) Appl. No.: 14/189,692

(22) Filed: Feb. 25, 2014

(65) Prior Publication Data
US 2015/0239548 A1    Aug. 27, 2015

(51) Int. Cl.
*B64C 1/14*    (2006.01)

(52) U.S. Cl.
CPC ............. *B64C 1/1492* (2013.01); *B64C 1/1484* (2013.01)

(58) Field of Classification Search
CPC .............................. B64C 1/1492; B64C 1/1484
See application file for complete search history.

(56) References Cited

U.S. PATENT DOCUMENTS

| | | | | |
|---|---|---|---|---|
| 2,989,787 A * | 6/1961 | Smith | ............................ | 52/202 |
| 3,421,614 A * | 1/1969 | Crane | ........................... | 206/290 |
| 4,364,533 A * | 12/1982 | Pompei et al. | ............. | 244/129.3 |
| 4,450,661 A * | 5/1984 | Whitener | .............. | B64C 1/1484 |
| | | | | 244/120 |
| 5,271,581 A * | 12/1993 | Irish | ........................... | 244/129.3 |
| 5,467,943 A | 11/1995 | Umeda | | |
| 6,168,112 B1 * | 1/2001 | Mueller et al. | ............. | 244/129.3 |
| 7,552,896 B2 | 6/2009 | Coak | | |
| 7,823,833 B2 | 11/2010 | Wood | | |
| 2007/0095984 A1 * | 5/2007 | Wood | ......................... | 244/129.3 |
| 2007/0137117 A1 * | 6/2007 | Carlson et al. | ............... | 52/204.1 |
| 2008/0067288 A1 | 3/2008 | Eberth et al. | | |
| 2008/0308677 A1 | 12/2008 | Kirchoff et al. | | |
| 2009/0084900 A1 | 4/2009 | Krahn | | |
| 2011/0186684 A1 | 8/2011 | Eberth et al. | | |
| 2012/0228428 A1 * | 9/2012 | Deganis | ................ | B64C 1/1492 |
| | | | | 244/129.3 |
| 2012/0241559 A1 | 9/2012 | Ebner et al. | | |
| 2013/0043348 A1 * | 2/2013 | Milliere | ...................... | 244/129.3 |
| 2014/0117160 A1 * | 5/2014 | McCammon | .............. | 244/129.3 |
| 2014/0319276 A1 * | 10/2014 | Yokoi | ......................... | 244/129.3 |

* cited by examiner

*Primary Examiner* — Gregory Strimbu

(74) *Attorney, Agent, or Firm* — Lathrop & Gage LLP

(57) ABSTRACT

A system and method for installing a window panel onto an aircraft including providing a retaining device having an outside edge that is sealed against an inboard surface of the aircraft. A biasing member mounted to an inside edge of the retaining device includes spring clips that press against the window panel. The spring clips push the window panel outward against the outside edge of the retaining device to maintain a seal around the edge of the window panel.

21 Claims, 5 Drawing Sheets

WINDOW ASSEMBLY INSTALLATION

BACKGROUND OF THE INVENTION

1. Field of the Invention

The invention relates generally to the field of aircraft design. More specifically, the invention relates to the field of aircraft window design and installation.

2. Description of the Related Art

Windows have been installed in aircraft for years. However, traditional aircraft window installation is difficult and time consuming. Each window installation requires an installer to hold a window in place while managing ten or more spring clips or other fastener to secure the window in place. Each spring clip or other fastener must be separately secured. Depending on the situation, it may require more than one installer per window—one to hold the window in place while the other secures the clips or fasteners—increasing the time and cost of installing the windows on an aircraft.

Additionally, fasteners typically used to hold aircraft window assemblies in place include rivets or other mechanical fasteners. These fasteners are visible from the outside, detracting from the ideally smooth overall appearance of the aircraft.

Further, the pressures that an aircraft withstands at a higher altitude cause the fasteners to shift. Many times, this will cause the paint on the outside of the aircraft to crack and eventually flake off. When the paint flakes off, it exposes the material underneath to the harsh elements—both on the ground and at elevated altitudes. This can cause corrosion of the material, leading to much larger issues. Furthermore, the chipping of paint decreases the aesthetic appeal of the aircraft making it appear old and run-down. This can cause major concern to passenger, even if the aircraft is in prime flying condition. Therefore, aircraft owners and operators incur a large expense in maintaining the paint on the aircraft to both protect it from corrosion and to maintain a clean image with consumers.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented below.

In an embodiment, a system for installing a window panel into an aperture defined into an aircraft skin is disclosed. The system includes a retaining device having an outside edge sealed against an inboard surface of the aircraft skin, a biasing member mounted on an inboard edge of the retaining device, and a plurality of protrusions secured onto the biasing member, the protrusions pressing against an inboard surface of the outside edge of the window panel, thus compelling the window panel outward, maintaining the seal against an inboard surface of the retaining device.

In another embodiment, an aircraft window assembly is disclosed, having a retaining device that includes a cross-member; an outside edge extending perpendicular in both directions from the cross member, wherein the outside edge is autoclave bonded to an inboard surface of the aircraft skin; an inside edge extending perpendicular in one direction from the cross-member, having a plurality of apertures for receiving mechanical fasteners; a receiving area defined between the cross member and the outside edge of the retaining device; and a plurality of structural members extending between the outside edge and the inside edge of the receiving area, perpendicular to the cross-member, wherein the outside edge of the retaining device is sealed against an inboard surface of the aircraft skin. The assembly further includes a window panel inserted into the receiving area of the retaining device; a biasing member, further comprising a plurality of apertures, wherein the plurality of apertures correspond to the plurality of apertures in the inside edge of the retaining device; and a plurality of protrusions having a one-bend "J" configuration secured onto the biasing member, wherein the bends of the protrusions extend toward the center of the biasing member, and wherein the protrusions press against an inboard surface of the outside edge of the window panel, thus compelling the window panel outward.

In still another embodiment, a method of installing a window assembly is disclosed, consisting of the steps of (1) securing a retaining device onto an inboard surface of an aircraft skin, wherein the retaining device is configured to fit around the perimeter of an aperture cut into the aircraft skin; (2) securing a plurality of protrusions having a one-bend "J" configuration around the perimeter of a biasing member, wherein the biasing member is configured to sit atop the retaining device, and wherein the bends of the protrusions extend toward the center of the biasing member; (3) placing a seal around the perimeter of a receiving area of the biasing member; (4) receiving a window panel into the receiving area of the retaining device such that it sits atop the seal; (5) placing the biasing member with the plurality of protrusions attached thereto atop the retaining device; (6) aligning apertures in the biasing member with apertures in the retaining device; and (7) securing the biasing member to the retaining device.

Further embodiments and aspects will become apparent by reference to the drawings and by study of the following detailed description.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
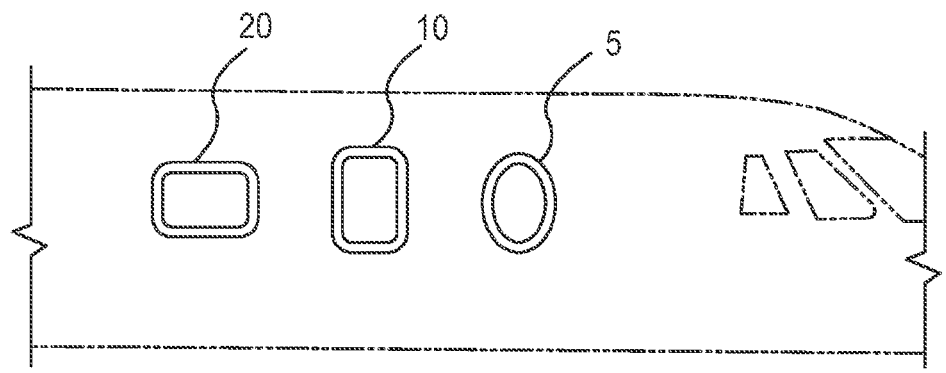
FIG. 1 is an illustration of an installed window assembly from the outside of an aircraft.

Embodiments of the present invention provide a window assembly 100 and method of installation. A representative window frame assembly 100 includes a window frame 105, a window 110, a seal 120, and a biasing member 130 (spring clip band) with spring clips 140 attached thereto. According to some embodiments, the window frame assembly 100 may be provided for use on an aircraft. However, it will be understood that while the invention herein is described primarily in relation to its use on an aircraft, the window frame assembly 100 may also be provided for use on other structures requiring an airtight pressure seal around the window.

In an exemplary embodiment, at least one window cutout 5, 10, 20 is provided in the skin 160 of the fuselage of an aircraft for accepting the window frame assembly 100. As is further described in detail below, the window frame 105 is bonded to the inside face of the skin 160 removing the need for mechanical fasteners. A seal 120 placed around the inside edge 230 of the window frame 105 is held into place by the window 110 and the spring clip band 130 having spring clips 140 attached thereto, thereby creating an airtight pressure seal. Alternatively, the seal 120 may be bonded to the window 110. The spring plate band 130 may be coupled to the window frame 105 using any suitable means. In a preferred embodiment, the spring plate band 130 is mechanically coupled to the window frame 105 to facilitate easy removal and replacement of the window.

Referring now to the figures, FIG. 1 is an illustration of the outside of an aircraft showing various exemplary configurations of window cutouts 5, 10, 20. Window cutouts may have many configurations, including ovular, as shown at 5 or rectangular, as shown at 10 and 20.

Figure 2:
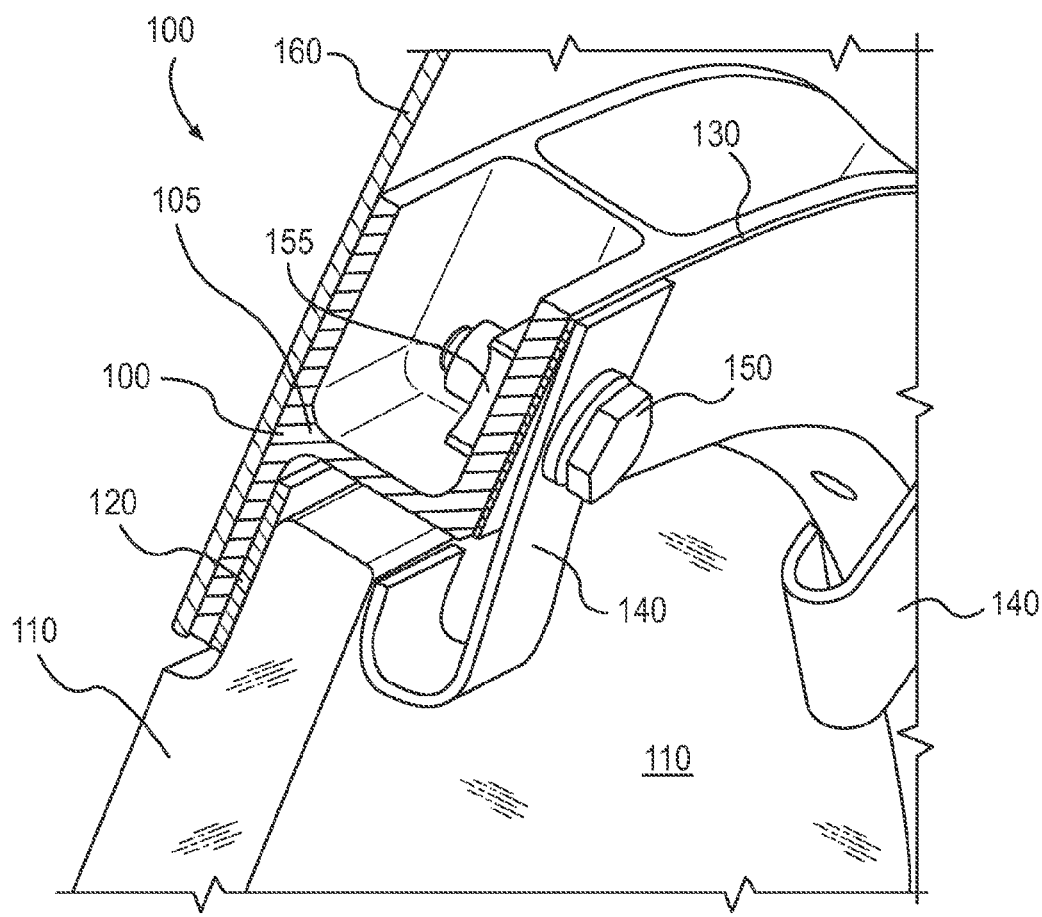
FIG. 2 is a partial cross sectional perspective view of a window assembly according to an embodiment.

FIG. 2 is a perspective view of a window frame assembly 100 according to one embodiment. The window frame assembly 100 includes a window frame 105, a window 110, a seal 120, a spring clip band 130 with at least one spring clip 140 attached thereto, and at least one bolt 150 and nutplate 155 for securing the band 130 to the frame 105. The window frame 105 provides structural support for the window 110 and the spring clip band 130 having spring clips 140 attached thereto.

Figure 3A:
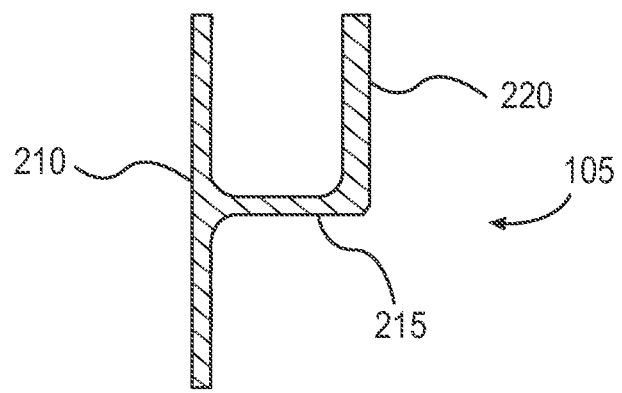
FIG. 3A is an illustration of the cross-section of the window frame of FIG. 2.
Figure 3B:
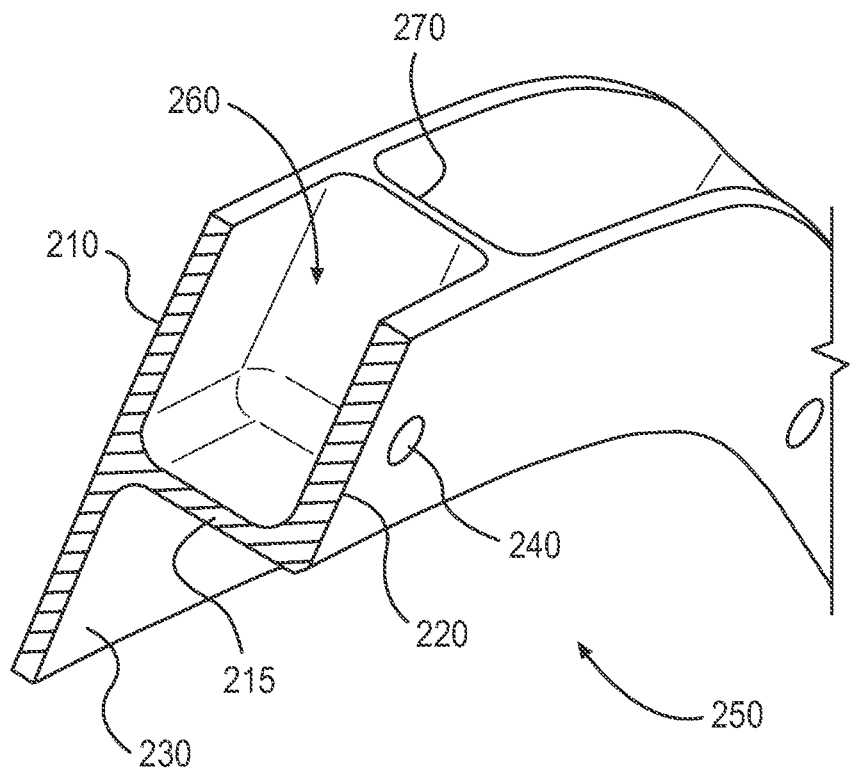
FIG. 3B is a partial cross sectional perspective view of the window frame assembly of FIG. 2.

With references to FIGS. 3A-B, the window frame 105 includes an outer flange 210, an inner flange 220, and a cross-member 215. The inner flange 220 extends in one perpendicular direction from the cross-member 215, while the outer flange 210 extends in both perpendicular directions from the cross-member 215, parallel to the inner flange 220. A window receiving area 250 is defined in the space between the inside face 230 of the outer flange 210 and the cross member 215. An opening 260 for receiving fasteners is defined between the outer flange 210, the inner flange 220, and the cross member 215. Walls 270 may be interspersed between the outer member 210 and the inner member 220 to further define individual openings 260 for receiving mechanical fasteners through apertures 240 in the inner member 220 while allowing the frame 105 to maintain structural stability at high pressures and flight loads.

The shape and dimensions of the outer flange 210 of the window frame 105 may correspond to the dimensions of the window cutout 5, 10, 20 such that the outer flange 210 rests flush against the inside skin of the aircraft 160 (FIG. 2). In other words, the inner diameter of the outer flange 210 may be substantially equal to the diameter of the window cutout 5, 10, 20, while the outer diameter of the outer flange 210 is greater than the diameter of the window cutout 5, 10, 20. The window frame 105 may be formed of any suitable material. In an embodiment, the window frame 105 is formed from integrally stiffened aluminum, but it may also be formed from any other acceptable material including titanium, magnesium, or the like.

The window frame 105 may be secured to the skin 160 through autoclave bonding, thereby eliminating the need for mechanical fasteners between the window frame 105 and the skin 160. Any known and widely acceptable method for autoclave bonding that produces a bonded product consistent with professional specifications may be used. An example of such a method may be found in U.S. Pat. No. 8,182,640.

Referring back to FIG. 2, a seal 120 may be placed around the inner edge 230 of the outer flange 210 of the frame 105 to provide a substantially airtight seal around the periphery of the window 110. With the seal 120 in place, the window 110 may be received into the window receiving area 250 (FIG. 3B). The outer face of the window presses against the seal 120 to hold the seal 120 in place. Alternatively, the seal 120 may be bonded directly to the window 110 before installation of the window 110. The spring clip band 130 having spring clips 140 attached thereto is then fastened adjacent to the inner flange 220 of the window frame 105 to secure the window 110 in place, as described in further detail below.

In an embodiment, the spring clip band 130 is comprised of a generally planar strip of material with dimensions substantially corresponding to the inner flange 220 of the window frame 105. The spring clip band 130 may be placed adjacent to the inner flange 220 of the window frame. Apertures in the spring clip band 130 align with the apertures 240 (FIG. 3B) in the window frame 105. In alternate embodiments, the spring clip band 130 may be rectangular, ellipsoidal, et cetera, as the window cutout 5, 10, 20, and thus the window frame 105, requires.

Spring clips 140 attached to the spring clip band 130 provide support for the window 110. The spring clips 140 may be attached to the band 130 using known techniques, including mechanical fasters, such as rivets, or chemical bonding prior to the band 130 being secured to the frame 105. Preassembling the clips 140 to the band 130 aids ease of final installation of the window frame assembly 100. The spring clips 140 are fastened to the band 130 such that the clip 140 engages the window 110 and holds it securely in place, when secured to the window frame 105.

Figure 4A:
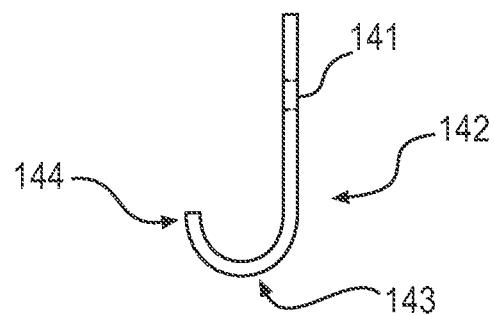
FIG. 4A is a side view of a spring clip.

In terms of configuration, in one embodiment, the spring clips 140 may have a downwardly extending portion 142 for abutting the spring clip band 130, leading to an outwardly extending portion 143 that leads to and terminates with an upwardly extending portion 144, as shown, for example, in FIG. 4A. It may be preferable for the downwardly extending portion of the spring clip 140 to be substantially planar such that the spring clip 140 rests flush against the spring clip band 130. In other embodiments, the spring clip 140 may include a downwardly extending portion 142 leading to and terminating with an outwardly extending portion 143.

Figure 4B:
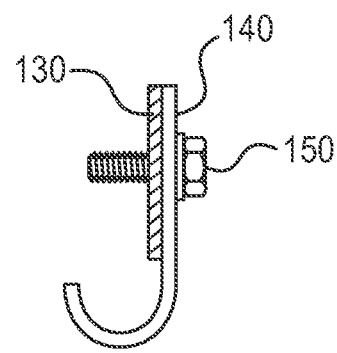
FIG. 4B is a side view of the biasing member of FIG. 4A.

In embodiment, the outwardly extending portion 143 may conclude with a contact member (not shown) for abutting the window 110. The contact member may be, for example, a plastic covering that allows the spring clip 140 to touch the window 110 without scratching the glass, and preventing the clip 140 from slipping. In a further embodiment, the spring clip 140 may use a single bend design extending from a downwardly extending portion 142, comprising a substantially "J" cross-section, as shown in FIGS. 4A-B. Apertures 141 in the downwardly extending portion of the spring clip 140, indicated by broken lines in FIG. 4A, align with apertures 240 (FIG. 5A) in the spring clip band 130 allowing for the spring clip band 130 to be fastened to window frame 105.

The shape, positioning, and number of the clips 140 may vary. Various shapes of spring clips 140 have traditionally been used in the industry. In addition to the "J" configuration described herein, other spring clips 140 such as flat springs, "L"-shaped springs, and springs having other bending configurations may be used, as appropriate.

Figure 5A:
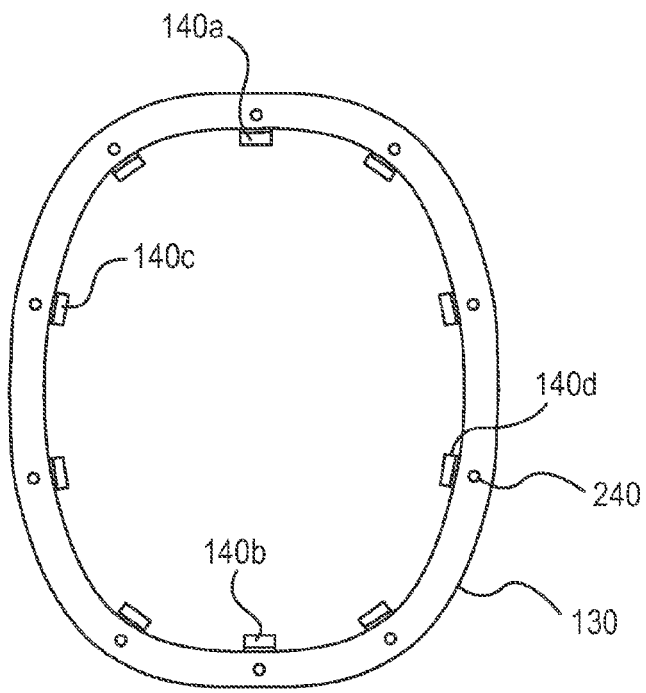
FIG. 5A is a rear view of a biasing member having spring clips attached thereto.
Figure 5B:
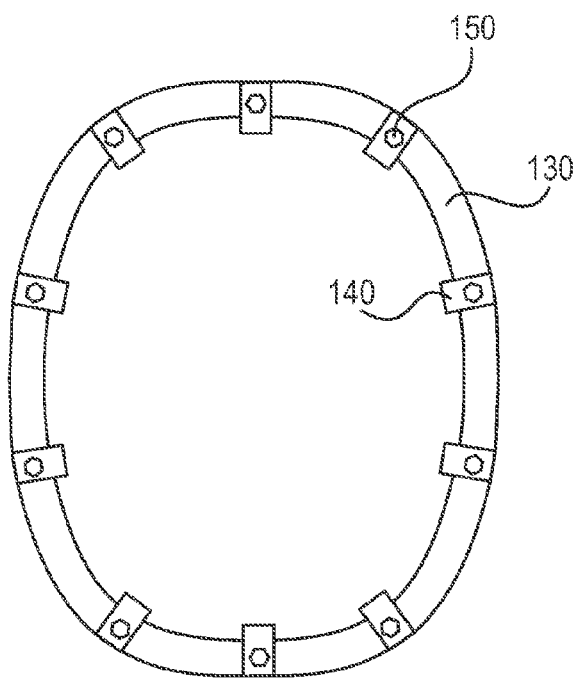
FIG. 5B is a front view of the biasing member of FIG. 5A.

Referring to FIGS. 5A-B, it can be seen that the clips 140 are spaced apart around the band 130 so as to apply pressure uniformly about the engaged edge of the window 110. Also, certain clips 140 may be oppositely positioned across the window 110 from others so that both ends of the window 110 are borne against. For example, clip 140a is located almost directly across the window edge from corresponding clip 140b. Similarly, clip 140c is directly across from corresponding clip 140d. It will be recognized from FIGS. 5A-C that the spaced-apart relationship of the corresponding clip pairs presents, in the disclosed embodiments, a clocked appearance. By clocked, it is not meant that any particular spacing is required, but rather that the spaced apart relationship is one that provides reasonably uniform support about the outside edge of the window 110.

Different numbers of oppositely disposed clips 140 may be used to hold the window in place, so long that they substantially hold the window 110 in place during and after installation. It should be noted that in alternative embodiments, it may be suitable to have no more than two substantially oppositely positioned spring clips 140 attached to the spring clip band 130. Alternatively, additional spring clips 140 could be used to hold the window 110 in place.

With the spring clips 140 fastened to the biasing member 130, the seal 120 and the window 110 may be received into the receiving area 250 (FIG. 3B) of the frame 105 and held in place. The biasing member 130 may then be fastened to the inner flange 220 of the window frame 105 using mechanical fasteners, such as a bolt 150, for example, as shown in FIG. 2. A nutplate 155 may be pre-secured to the outboard edge of the inner flange 220 around the aperture 240 using any appropriate method. Pre-securing the nutplate 155 to the inner flange 220 further aids in the installation process, allowing the nutplate 155 to accept the bolt 150 as the bolt 150 is inserted into the assembly, rather than requiring a separate step of inserting the bolt 150 through the apertures 141, 240 in the spring clip 140 and the frame 105, respectively, and securing the nutplate or nut 155 to the bolt 150. Alternately, the mechanical fastener may be a screw and a nutplate, a pin, or a screw and nut. Additionally, the nutplate or nut may be replaced by a threaded hole in the window frame configured for receiving a bolt or screw.

Figure 5C:
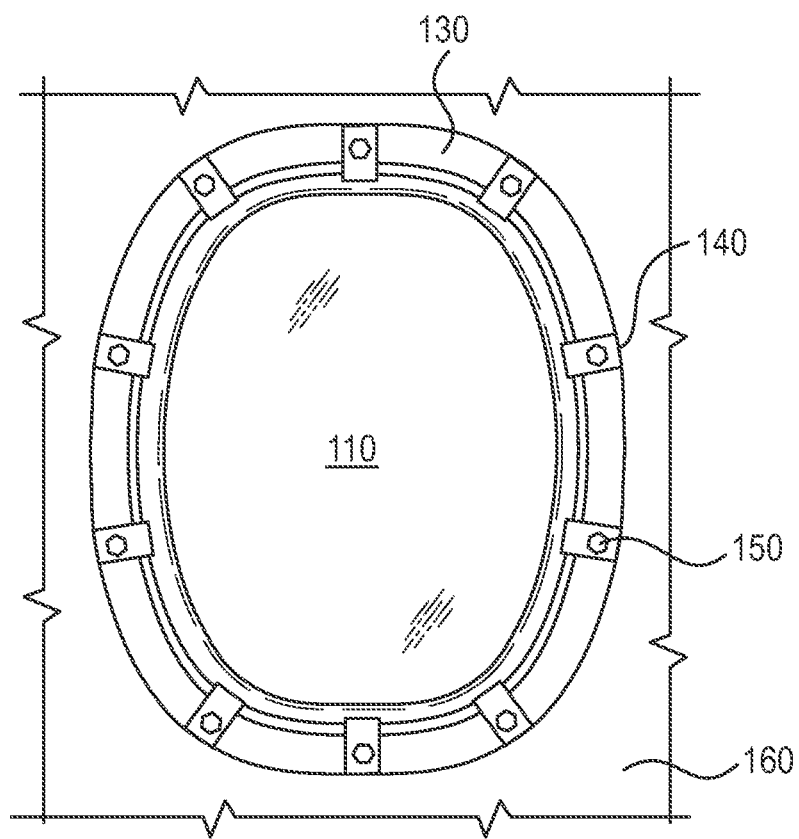
FIG. 5C is an illustration of an installed window assembly from the inside of the aircraft.

As the biasing member 130 is attached to the window frame 105, the outwardly and/or upwardly extending portion of the spring clip 140 comes into contact with the window 110 and presses against the window 110, holding the seal 120 and the window 110 in place. FIG. 5C illustrates an installed aircraft window assembly 100 from inside the cabin of the aircraft.

The pressure exerted on the window 110 by the spring clips 140, once the biasing member 130 has been securely fastened to the window frame 105, is sufficient to provide a pressure and weather seal, as illustrated by the skewed clip 140 in FIG. 2.

In addition to the ease of installation that the present invention provides, the window frame assembly 100 is easily disassembled when replacement of parts becomes necessary. There are numerous reasons why a window 110 or seal 120 may need to be replaced. For window assemblies 100 that include spring clips 140 that are each separately attached to the frame, this is a time consuming and often frustrating task. The present invention allows for the spring clips 140 to be removed all at once by releasing the biasing member 130. The window 110 may be easily removed from the window receiving area 250 and the window 110, seal 120, or both may be easily replaced. The biasing member 130 may then be re-attached to the window frame 105 and the window frame assembly 100 is again complete.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An aircraft window assembly, comprising:
   a window panel;
   a retaining device including:
      a cross-member;
      an outside edge extending from the cross-member generally perpendicular thereto, the outside edge including a generally planar surface extending from between distal ends of the outside edge, substantially all of the generally planar surface is adapted to engage an inboard surface of an aircraft skin;
      an inside edge opposing the outside edge and extending from the cross-member generally perpendicular thereto;
      a plurality of structural members extending from each extending from and between the inside edge, the outside edge, and the cross-member;
      a biasing member mounted on the inside edge of the retaining device;
      a plurality of protrusions secured to the biasing member, the protrusions pressing against a perimeter of an inboard surface of the window panel, thus compelling the window panel against the outside edge of the retaining device.

2. The window assembly of claim 1, wherein an outer perimeter dimension of the outside edge is larger than a perimeter of an aperture defined by the aircraft skin.

3. The window assembly of claim 1, wherein an inside perimeter dimension of the biasing member corresponds to an inside perimeter dimension of the inside edge.

4. The window assembly of claim 1, wherein the plurality of protrusions includes an even number of said protrusions.

5. The window assembly of claim 1, wherein each said protrusion comprises a portion extending along the biasing member and an engagement portion engaging the window panel.

6. The window assembly of claim 1, wherein each of the plurality of protrusions is "J" shaped.

7. The window assembly of claim 1, wherein the plurality of protrusions is spaced around the biasing member.

8. The window assembly of claim 7, wherein the protrusions are substantially equally spaced around a perimeter of the biasing member.

9. The window assembly of claim 1, wherein the plurality of protrusions is attached to a perimeter of the biasing member using a connection selected from the group consisting of: mechanical fastening, welding, and chemical bonding.

10. The window assembly of claim 1, wherein the outside edge of the retaining device is autoclave bonded to the inboard surface of the aircraft skin.

11. An aircraft window assembly, comprising:
a retaining device including:
   a cross-member;
   an outside edge extending generally perpendicular from the cross-member generally perpendicular thereto, the outside edge including a generally planar surface extending from distal ends of the outside edge, wherein substantially all of the generally planar surface is adapted to engage an inboard surface of an aircraft skin and the outside edge is autoclave bonded to the inboard surface of the aircraft skin;
   an inside edge opposing the outside edge and extending from the cross-member generally perpendicular thereto, the inside edge including a plurality of apertures for receiving mechanical fasteners;
   a receiving area defined between the cross-member and the outside edge of the retaining device; and
   a plurality of structural members each extending from and between the inside edge, the outside edge, and the cross-member;
   wherein said substantially all of the generally planar surface of the outside edge of the retaining device is sealed against the inboard surface of the aircraft skin;
a window panel inserted into the receiving area of the retaining device;
a biasing member comprising a plurality of apertures, wherein the plurality of apertures of the biasing member correspond to the plurality of apertures of the inside edge of the retaining device; and
a plurality of protrusions secured to the biasing member, each said protrusion comprising:
   a portion extending along the biasing member; and
   an engagement portion abutting the window panel and compelling the window panel toward the outside edge.

12. The window assembly of claim 11, wherein each of the plurality of protrusions includes an aperture configured to secure the protrusion to the perimeter of the biasing member.

13. The window assembly of claim 12, wherein each of the apertures of the inside edge aligns with a respective one of the apertures of the biasing member and a respective one of the apertures of the plurality of protrusions.

14. The window assembly of claim 13, wherein the biasing member is secured to the inside edge by inserting mechanical fasteners through the aligned apertures of the biasing member, the plurality of protrusions, and the inside edge.

15. The window assembly of claim 11, wherein the plurality of protrusions is secured to the biasing member using a connection selected from the group consisting of: mechanical fastening, welding, and chemical bonding.

16. The window assembly of claim 11, further comprising a seal located between the window panel and the outside edge.

17. The window assembly of claim 16, wherein the protrusions press against the window panel so that the window panel engages the seal.

18. The window assembly of claim 11, wherein each of the plurality of protrusions is "J" shaped.

19. A method of installing a window panel, comprising:
providing a retaining device including a cross member, an inside edge extending from the cross member generally perpendicular thereto, an outside edge opposing the inside edge and extending from the cross member generally perpendicular thereto, and a plurality of structural members each extending from and between the inside edge, the outside edge, and the cross-member, wherein the outside edge includes a generally planar surface extending from distal ends of the outside edge, securing substantially all of the generally planar surface of the outside edge of the retaining device to an inboard surface of an aircraft skin such that the outside edge extends around a perimeter of an aperture defined by the aircraft skin;
attaching a plurality of protrusions to a biasing member, each of the protrusions including a portion extending along the biasing member and an engagement porion;
placing a seal in a receiving area of the retaining device, said receiving area defined by the outside edge and the cross-member;
placing the window panel into the receiving area of the retaining device such that window panel contacts the seal;
attaching the biasing member with the plurality of protrusions attached thereto to the inside edge, wherein the engagement portion of each of the plurality of protrusions abuts the window panel; and
securing the biasing member to the inside edge such that the plurality of protrusions compel the window panel outward toward the outside edge and against the seal.

20. The method of claim 19, further comprising autoclave bonding the outside edge of the retaining device to the inboard surface of the aircraft skin.

21. The method of claim 19, further comprising securing a wherein the step of securing the biasing member to the inside edge includes aligning each one of a plurality of apertures defined by the biasing member with a respective one of a plurality of apertures of the inside edge and inserting fasteners inside edge.

* * * * *